United States Patent
Morrison et al.

(10) Patent No.: US 7,492,357 B2
(45) Date of Patent: Feb. 17, 2009

(54) APPARATUS AND METHOD FOR DETECTING A POINTER RELATIVE TO A TOUCH SURFACE

(75) Inventors: Gerald D. Morrison, Calgary (CA); David E. Holmgren, Calgary (CA)

(73) Assignee: Smart Technologies ULC (CA)

( * ) Notice: Subject to any disclaimer, the term of this patent is extended or adjusted under 35 U.S.C. 154(b) by 569 days.

(21) Appl. No.: 10/838,536

(22) Filed: May 5, 2004

(65) Prior Publication Data

US 2005/0248539 A1 Nov. 10, 2005

(51) Int. Cl.
*G09G 5/00* (2006.01)
(52) U.S. Cl. ........... 345/173; 345/175; 345/178
(58) Field of Classification Search .......... 345/173, 345/175, 178
See application file for complete search history.

(56) References Cited

U.S. PATENT DOCUMENTS

| | | | |
|---|---|---|---|
| 4,144,449 A | 3/1979 | Funk et al. | |
| 4,247,767 A | 1/1981 | O'Brien et al. | |
| 4,507,557 A | 3/1985 | Tsikos | |
| 4,558,313 A | 12/1985 | Garwin | |
| 4,737,631 A | 4/1988 | Sasaki | |
| 4,742,221 A | 5/1988 | Sasaki et al. | |
| 4,746,770 A | 5/1988 | McAvinney | |
| 4,782,328 A | 11/1988 | Denlinger | |
| 4,818,826 A | 4/1989 | Kimura | |
| 4,822,145 A | 4/1989 | Staelin | |
| 5,097,516 A | 3/1992 | Amir | |
| 5,109,435 A | 4/1992 | Lo et al. | |
| 5,130,794 A | 7/1992 | Ritcher | |
| 5,317,140 A * | 5/1994 | Dunthorn | 250/221 |
| 5,359,155 A | 10/1994 | Helser | |
| 5,483,261 A | 1/1996 | Yasutake | |
| 5,483,603 A | 1/1996 | Luke et al. | |
| 5,484,966 A | 1/1996 | Segen | |
| 5,502,568 A | 3/1996 | Ogawa et al. | |
| 5,554,828 A | 9/1996 | Primm | |
| 5,581,276 A | 12/1996 | Cipolla et al. | |
| 5,638,092 A | 6/1997 | Eng et al. | |

(Continued)

FOREIGN PATENT DOCUMENTS

CA 2493236 12/2003

(Continued)

OTHER PUBLICATIONS

Bernhard P. Wrobel, "Minimum Solutions for Orientation", Calibration and Orientation of Cameras in Computer Vision, Springer Series in Information Sciences, vol. 34, 2001, pp. 28-33.

(Continued)

*Primary Examiner*—Richard Hjerpe
*Assistant Examiner*—Leonid Shapiro
(74) *Attorney, Agent, or Firm*—Katten Muchin Rosenman LLP

(57) ABSTRACT

An apparatus for detecting a pointer relative to a touch surface includes at least two spaced imaging assemblies having overlapping fields of view encompassing the touch surface. The imaging assemblies see the touch surface in three-dimensions as a perspective view. The imaging assemblies acquire overlapping images from different locations. A processor receives and processes image data generated by at least one of the imaging assemblies to determine the location of the pointer relative to the touch surface.

75 Claims, 13 Drawing Sheets

U.S. PATENT DOCUMENTS

| | | | |
|---|---|---|---|
| 5,729,704 | A | 3/1998 | Stone et al. |
| 5,736,686 | A | 4/1998 | Perret, Jr. et al. |
| 5,737,740 | A | 4/1998 | Henderson et al. |
| 5,771,039 | A | 6/1998 | Ditzik |
| 5,818,421 | A | 10/1998 | Ogino et al. |
| 5,819,201 | A | 10/1998 | DeGraaf |
| 5,825,352 | A | 10/1998 | Bisset et al. |
| 5,831,602 | A | 11/1998 | Sato et al. |
| 5,911,004 | A | 6/1999 | Ohuchi et al. |
| 5,914,709 | A | 6/1999 | Graham et al. |
| 5,936,615 | A | 8/1999 | Waters |
| 5,963,199 | A | 10/1999 | Kato et al. |
| 5,982,352 | A | 11/1999 | Pryor |
| 5,988,645 | A | 11/1999 | Downing |
| 6,002,808 | A | 12/1999 | Freeman |
| 6,008,798 | A | 12/1999 | Mato, Jr. et al. |
| 6,061,177 | A | 5/2000 | Fujimoto |
| 6,100,538 | A | 8/2000 | Ogawa |
| 6,118,433 | A | 9/2000 | Jenkin et al. |
| 6,161,066 | A | 12/2000 | Wright et al. |
| 6,191,773 | B1 | 2/2001 | Maruno et al. |
| 6,208,330 | B1 | 3/2001 | Hasegawa et al. |
| 6,252,989 | B1 | 6/2001 | Geisler et al. |
| 6,256,033 | B1 | 7/2001 | Nguyen |
| 6,262,718 | B1 | 7/2001 | Findlay et al. |
| 6,310,610 | B1 | 10/2001 | Beaton et al. |
| 6,323,846 | B1 | 11/2001 | Westerman |
| 6,335,724 | B1 | 1/2002 | Takekawa et al. |
| 6,339,748 | B1 | 1/2002 | Hiramatsu |
| 6,353,434 | B1 | 3/2002 | Akebi |
| 6,359,612 | B1 | 3/2002 | Peter et al. |
| 6,414,671 | B1 | 7/2002 | Gillespie et al. |
| 6,421,042 | B1 | 7/2002 | Omura et al. |
| 6,429,856 | B1 | 8/2002 | Omura et al. |
| 6,507,339 | B1 | 1/2003 | Tanaka |
| 6,512,838 | B1 | 1/2003 | Rafii et al. |
| 6,518,600 | B1 | 2/2003 | Shaddock |
| 6,531,999 | B1 | 3/2003 | Trajkovic |
| 6,545,669 | B1 | 4/2003 | Kinawi et al. |
| 6,559,813 | B1 | 5/2003 | DeLuca et al. |
| 6,563,491 | B1 | 5/2003 | Omura |
| 6,594,023 | B1 | 7/2003 | Omura et al. |
| 6,608,619 | B2 | 8/2003 | Omura et al. |
| 6,626,718 | B2 | 9/2003 | Hiroki |
| 6,630,922 | B2 | 10/2003 | Fishkin et al. |
| 6,650,822 | B1 | 11/2003 | Zhou |
| 6,674,513 | B2 | 1/2004 | Omura et al. |
| 6,690,363 | B2 | 2/2004 | Newton |
| 6,690,397 | B1 | 2/2004 | Daignault, Jr. |
| 6,710,770 | B2 | 3/2004 | Tomasi et al. |
| 6,774,889 | B1 | 8/2004 | Zhang et al. |
| 6,803,906 | B1 | 10/2004 | Morrison et al. |
| 6,864,882 | B2 | 3/2005 | Newton |
| 6,933,981 | B1 | 8/2005 | Kishida et al. |
| 6,972,401 | B2 | 12/2005 | Akitt et al. |
| 6,972,753 | B1 | 12/2005 | Kimura et al. |
| 7,007,236 | B2 | 2/2006 | Dempski et al. |
| 7,015,418 | B2 | 3/2006 | Cahill et al. |
| 7,030,861 | B1 | 4/2006 | Westerman et al. |
| 7,202,860 | B2 | 4/2007 | Ogawa |
| 2001/0019325 | A1 | 9/2001 | Takeawa |
| 2001/0022579 | A1 | 9/2001 | Hirabayashi |
| 2001/0026268 | A1 | 10/2001 | Ito |
| 2001/0033274 | A1 | 10/2001 | Ong |
| 2002/0036617 | A1 | 3/2002 | Pryor |
| 2002/0050979 | A1 | 5/2002 | Oberoi et al. |
| 2002/0163530 | A1 | 11/2002 | Takakura et al. |
| 2003/0001825 | A1 | 1/2003 | Omura et al. |
| 2003/0025951 | A1 | 2/2003 | Pollard et al. |
| 2003/0043116 | A1 | 3/2003 | Morrison et al. |
| 2003/0063073 | A1* | 4/2003 | Geaghan et al. ............. 345/173 |
| 2003/0071858 | A1 | 4/2003 | Morohoshi |
| 2003/0085871 | A1 | 5/2003 | Ogawa |
| 2003/0095112 | A1 | 5/2003 | Kawano et al. |
| 2003/0151532 | A1 | 8/2003 | Chen et al. |
| 2004/0021633 | A1 | 2/2004 | Rajkowski |
| 2004/0031779 | A1 | 2/2004 | Cahill et al. |
| 2004/0046749 | A1 | 3/2004 | Ikeda |
| 2004/0149892 | A1 | 8/2004 | Akitt et al. |
| 2004/0178993 | A1 | 9/2004 | Morrison et al. |
| 2004/0178997 | A1 | 9/2004 | Gillespie et al. |
| 2004/0179001 | A1 | 9/2004 | Morrison et al. |
| 2004/0189720 | A1 | 9/2004 | Wilson et al. |
| 2005/0052427 | A1 | 3/2005 | Wu et al. |
| 2005/0057524 | A1 | 3/2005 | Hill et al. |
| 2005/0151733 | A1 | 7/2005 | Sander et al. |
| 2005/0190162 | A1 | 9/2005 | Newton |
| 2005/0248540 | A1 | 11/2005 | Newton |
| 2005/0276448 | A1 | 12/2005 | Pryor |
| 2006/0202953 | A1 | 9/2006 | Pryor et al. |
| 2006/0274067 | A1 | 12/2006 | Hidai |
| 2007/0075982 | A1 | 4/2007 | Morrison et al. |
| 2007/0126755 | A1 | 6/2007 | Zhang et al. |
| 2007/0236454 | A1 | 10/2007 | Ung et al. |
| 2008/0129707 | A1 | 6/2008 | Pryor |

FOREIGN PATENT DOCUMENTS

| | | |
|---|---|---|
| DE | 198 10452 A1 | 12/1998 |
| EP | 0279652 A | 8/1988 |
| EP | 0347725 A2 | 12/1989 |
| EP | 0762319 A2 | 3/1997 |
| EP | 0829798 A2 | 3/1998 |
| JP | 57-211637 A | 12/1982 |
| JP | 8-240407 A | 9/1996 |
| JP | 9-091094 A | 4/1997 |
| JP | 9-319501 A | 12/1997 |
| JP | 10-105324 A | 4/1998 |
| JP | 2003-167669 A | 6/2003 |
| JP | 2003-173237 A | 6/2003 |
| JP | 2001-282456 A | 11/2007 |
| WO | 99/21122 A1 | 4/1999 |
| WO | WO 99/40562 | 8/1999 |
| WO | WO 02/03316 | 1/2002 |
| WO | 02/27461 A1 | 4/2002 |
| WO | WO 03/105074 | 12/2003 |

OTHER PUBLICATIONS

Kenichi Kanatani, "Camera Calibration", Geometric Computation for Machine Vision, Oxford Engineering Science Series, vol. 37, 1993, pp. 56-63.

Richard Hartley and Andrew Zisserman, "Multiple View Geometry in Computer Vision", Cambridge University Press, First published 2000, Reprinted (with corrections) 2001, pp. 70-73, 92-93, and 98-99.

Wolfgang Förstner, "On Estimating Rotations", Festchrift für Prof. Dr.-Ing. Heinrich Ebner zum 60. Geburtstag, Herausg.: C. Heipke und H Mayer, Lehrstuhl für Photogrammetrie und Femerkundung, TU München, 1999, 12 pages. (http://www.ipb.uni-bonn.de/papers/#1999).

European Search Report for EP 06 01 9269 for a search that was completed on Nov. 9, 2006.

European Search Report for EP 06 01 9268 for a search that was completed on Nov. 9, 2006.

European Search Report for EP 02 25 3594 for a search that was completed on Dec. 14, 2005.

European Search Report for EP 04 25 1392 for a search that was completed on Jan. 11, 2007.

Wang, Fie-Yue, "Stereo camera calibration without absolute world coordinate information", SPIE, vol. 2620, pp. 655-662, Jun. 14, 1995.

Bud K. Funk, CCDs in optical panels deliver high resolution, Electronic Design, Sep. 27, 1980, pp. 139-143.

International Search Report with a date of a mailing of Oct. 22, 2001 for PCTICA 01100980 with an International Filing Date of Jul. 5, 2001.

Partial European Search Report with a search completion date of May 19, 2006 for European Patent Application EP 0 325 7166 filed Nov. 13, 2003.

* cited by examiner

PRIMARY TRIAGULATION PAIR: C1 + C2
CAMERA C3 MAY SEE POINTER P

C3 MAY: -IGNORE POINTER P (TOO FAR AWAY)
-PASSIVELY TRACK POINTER P
-ASSIST IN TRANGULATION OF POINTER P
(C1 + C3, C2 + C3)

PRIMARY TRIAGULATION PAIRS: C1 + C2, C1 + C3, C2 + C3
CAMERA C4 MAY SEE POINTER P

C4 MAY: -IGNORE POINTER P (TOO FAR AWAY)
-PASSIVELY TRACK POINTER P
-ASSIST IN TRANGULATION OF POINTER P
(C1 + C4, C2 + C4, C3 +C4)

PRIMARY TRIAGULATION PAIR: C2 + C3
CAMERA C1 AND C4 MAY SEE POINTER P

C1 & C4 MAY:  -IGNORE POINTER P (TOO FAR AWAY)
 -PASSIVELY TRACK POINTER P
 -ASSIST IN TRANGULATION OF POINTER P
  C1 + C2, C1 + C3, C1 + C4,
  C2 + C3, C2 + C4
  C3 + C4

APPARATUS AND METHOD FOR DETECTING A POINTER RELATIVE TO A TOUCH SURFACE

FIELD OF THE INVENTION

The present invention relates generally to interactive input systems and in particular to an apparatus and method for detecting a pointer relative to a touch surface.

BACKGROUND OF THE INVENTION

Touch systems are well known in the art and typically include a touch screen having a touch surface on which contacts are made using a pointer in order to generate user input. Pointer contacts with the touch surface are detected and are used to generate corresponding output depending on areas of the touch surface where the pointer contacts are made. Common touch systems utilize analog resistive, electromagnetic, capacitive, acoustic or machine vision techniques to identify pointer contacts on the touch surface.

For example, International PCT Application No. PCT/CA01/00980 filed on Jul. 5, 2001 and published under No. WO 02/03316 on Jan. 10, 2002, assigned to SMART Technologies Inc., assignee of the present invention, discloses a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look generally across the plane of the touch surface. The digital cameras acquire images looking across the touch surface from different locations and generate image data. Image data acquired by the digital cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y)-co-ordinates relative to the touch surface using triangulation. The pointer co-ordinate data is conveyed to a computer executing one or more applications programs. The computer uses the pointer co-ordinate data to update the computer-generated image that is presented on the touch surface. Pointer contacts on the touch surface can therefore be recorded as writing or drawing or used to control execution of applications programs executed by the computer.

Although the above touch system works extremely well, improvements in vision-based touch systems are continually being sought.

It is therefore an object of the present invention to provide a novel apparatus and method for detecting a pointer relative to a touch surface.

SUMMARY OF THE INVENTION

According to one aspect of the present invention there is provided an apparatus for detecting a pointer relative to a touch surface comprising at least two spaced imaging devices having overlapping fields of view encompassing the touch surface. The imaging devices see the touch surface in three-dimensions as a perspective view. The imaging devices acquire images from different locations. A processor receives and processes image data generated by at least one of the imaging devices to determine the location of the pointer relative to the touch surface.

Each imaging device is calibrated to establish the relationship between points (X,Y,Z) in its perspective view and points (x,y) in acquired images. Each imaging device generates pointer co-ordinate data when a pointer is captured in an acquired image. The processor triangulates the pointer co-ordinate data to determine the location of the pointer relative to the touch surface.

In one embodiment, the apparatus includes a pair of imaging devices with each imaging device being positioned adjacent a different corner of the touch surface. Each imaging device is spaced from and spaced in front of the touch surface. Each imaging device is positioned relative to the touch surface so that at a minimum the entire periphery of the touch surface is within its perspective view.

In one embodiment, during calibration, calibration points (X,Y,Z) on the touch surface and image points (x,y) corresponding to the calibration points are measured. Collinearity equations are solved using the measured calibration and image points to determine external and internal orientation parameters of the imaging devices. The collinearity equations are solved using a least-squares method. The calibrations points are at spaced location along the periphery of the touch surface such as at the corners and edge mid-points of the touch surface. In an alternative embodiment, the external orientation parameters of the imaging devices are determined using a vanishing point method. In yet another embodiment, the external and internal orientation parameters of the imaging devices are determined using planar homography. In still yet another embodiment, the external orientation parameters of the imaging devices are determined using a three-point method.

In one embodiment, each imaging device generates a certainty value representing the degree of certainty that the imaging device has positively identified the pointer of the acquired image. The certainty value is used by the processor to determine pointer co-ordinate data to be used to determine the position of the pointer relative to the touch surface. The processor ignores pointer co-ordinate data generated by the imaging device when the certainty value associated therewith is below a threshold level.

According to another aspect of the present invention there is provided a camera-based touch system comprising a generally rectangular passive touch surface on which contacts are made using a pointer. Camera devices are removably mounted adjacent at least two corners of the touch surface. Each of the camera devices has a field of view looking across and back towards the touch surface and is disposed in front of the plane of the touch surface. The fields of view of the camera devices overlap over the touch surface. The camera devices acquire images of the touch surface. A processor receives and processes the image data to determine the location of the pointer relative to the touch surface via triangulation.

According to yet another aspect of the present invention there is provided an apparatus for detecting a pointer relative to a generally rectangular touch surface comprising at least two spaced imaging devices having overlapping fields of view encompassing the touch surface. The imaging devices see the touch surface in three-dimensions as a perspective view with the perspective view at a minimum including the four corners of the touch surface. The imaging devices acquire overlapping images from different locations. A processor receives and processes image data generated by at least one of the imaging devices to determine the location of the pointer relative to the touch surface using triangulation.

The present invention provides advantages in that since the imaging devices see the touch surface in three-dimensions as a perspective view, the imaging devices see the entire touch surface as well as its surrounding area. As a result, during image processing it is not necessary to process the entire images captured by the imaging devices but rather only pixels corresponding to information within the boundaries of the touch surface. Noise and other aberrations occurring in areas outside of the touch surface can be disregarded. In addition, the three-dimensional perspective of the imaging devices allows the apparatus to be automatically calibrated and calibrated on a continuing basis without the need for user intervention. Furthermore, the three-dimensional perspective of the imaging devices allows (x,y,z) co-ordinates to be assigned to each pointer appearing within the fields of view of the imaging devices. Thus, the apparatus is able to disambiguate between multiple pointers contacting the touch surface.

The present invention also provides advantages in that since the imaging devices are portable, they can be used to turn basically any surface into a touch surface. The imaging devices simply need to extend forwardly of the surface a sufficient distance so that their fields of view looking back and across the touch surface see the corners of the surface and are not obstructed by any bezel or framing surrounding the surface. The use of portable imaging devices that see the touch surface in three-dimensions as a perspective view also supports arbitrarily large or curved touch surfaces.

BRIEF DESCRIPTION OF THE DRAWINGS

Embodiments of the present invention will now be described more fully with reference to the accompanying drawings in which.

DETAILED DESCRIPTION OF THE EMBODIMENTS

Figure 1:
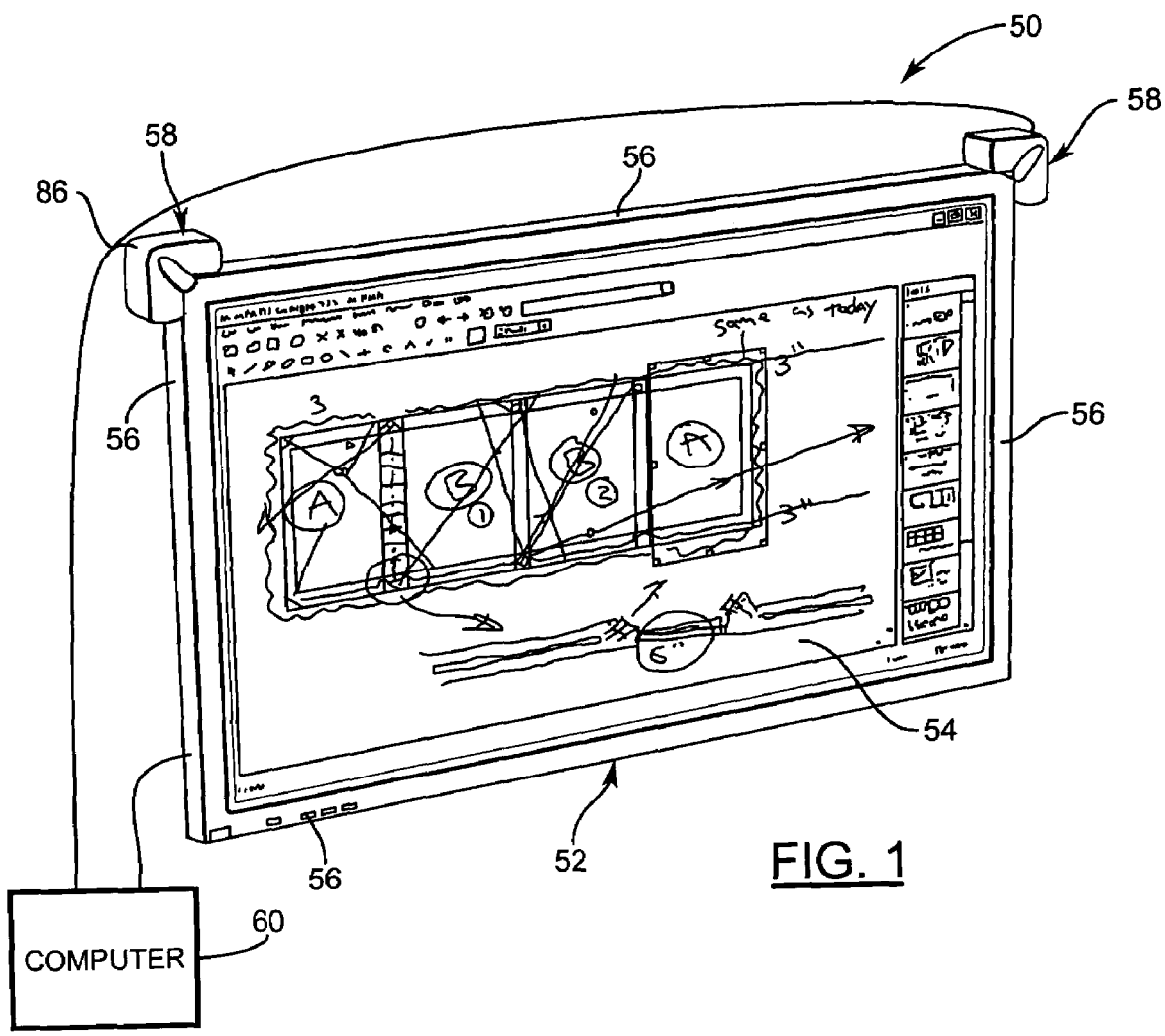
FIG. 1 is a schematic illustration, partially in perspective, of an apparatus for detecting a pointer relative to a touch surface.
Figure 2:
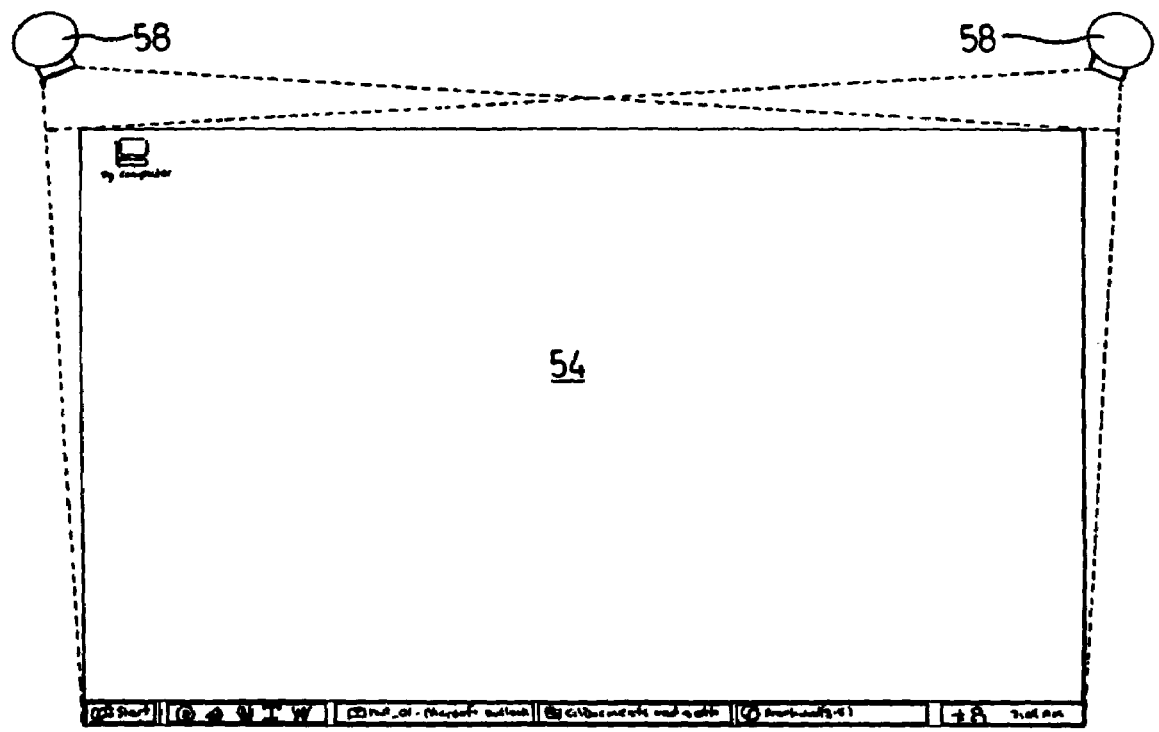
FIG. 2 is a schematic front plan view of the apparatus of FIG. 1.
Figure 3:
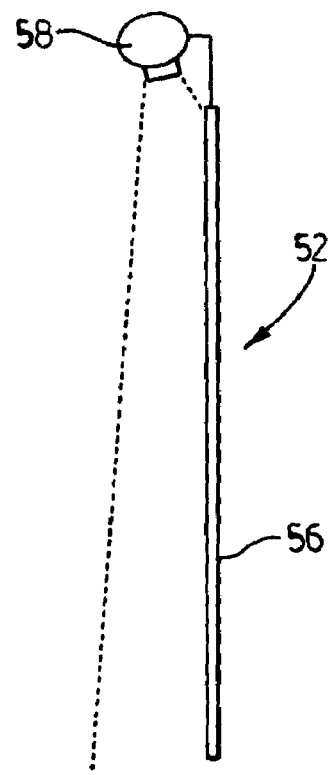
FIG. 3 is a schematic side view of the apparatus of FIG. 1.

Turning now to FIGS. 1 to 3, an apparatus for detecting a pointer relative to a touch surface is shown and is generally identified by reference numeral 50. In this embodiment, apparatus 50 is in the form of a touch system and includes a touch screen 52 having a touch surface 54 on which pointer contacts are to be made. Touch screen 52 is a flat panel display such as for example, a plasma display, a high-definition television (HDTV), a liquid crystal display (LCD) or the like that presents an image on the touch surface 54. A bezel 56 surrounds the touch surface 54. A pair of imaging assemblies 58 is positioned adjacent the top corners of the touch screen 52. The imaging assemblies 58 communicate with each other as well as with a computer 60 executing one or more application programs. The computer 60 processes pointer co-ordinate data generated by the imaging assemblies 58 to determine the locations of pointer contacts made on the touch surface 54 and updates the image that is presented on the touch surface 54 in response to the pointer contacts. Pointer contacts on the touch surface 54 can therefore be recorded as writing or drawing or used to control execution of application programs executed by the computer 60.

Figure 4:
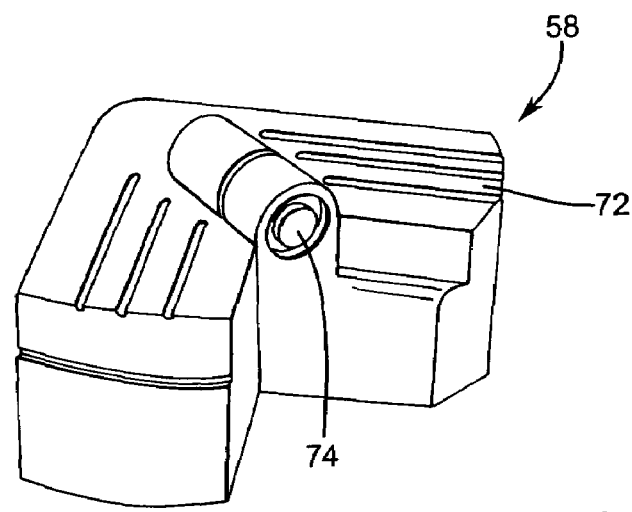
FIG. 4 is a perspective view of an imaging assembly forming part of the apparatus of FIG. 1.

Turning now to FIG. 4, one of the imaging assemblies 58 is better illustrated. As can be seen, the imaging assembly 58 includes a housing 72 shaped complimentary to the corner of the touch screen 52. Formations (not shown) on the housing 72 allow the imaging assembly 58 to be secured in position relative to the corner of the touch screen. The imaging assembly 58 can however be removed from the touch screen 52 making the imaging assembly 58 portable. A digital camera 74 is accommodated by the housing 72 and is positioned in front of the plane of the touch surface 54 by a distance equal to approximately 2.5 cm. This distance between the digital camera 74 and the plane of the touch surface 54 is selected so that the bezel 56 does not obstruct the field of view of the digital camera 74 allowing the digital camera to see the entire touch surface 54 while still permitting useful three-dimensional processing of image data. The digital camera 74 is also positioned above the touch surface 54 by a distance equal to approximately 10 cm. The digital camera 74 is aimed so that its field of view (FOV) looks back at and across the entire touch surface 54. Thus, the digital camera 74 sees the touch surface 54 including its four corners in three-dimensions as a perspective view. The optical axis of the digital camera 74 is in line with the top corner of the touch screen 52 and forms an angle equal to approximately 45 degrees with respect to the top edge of the touch screen 52.

Figure 5:
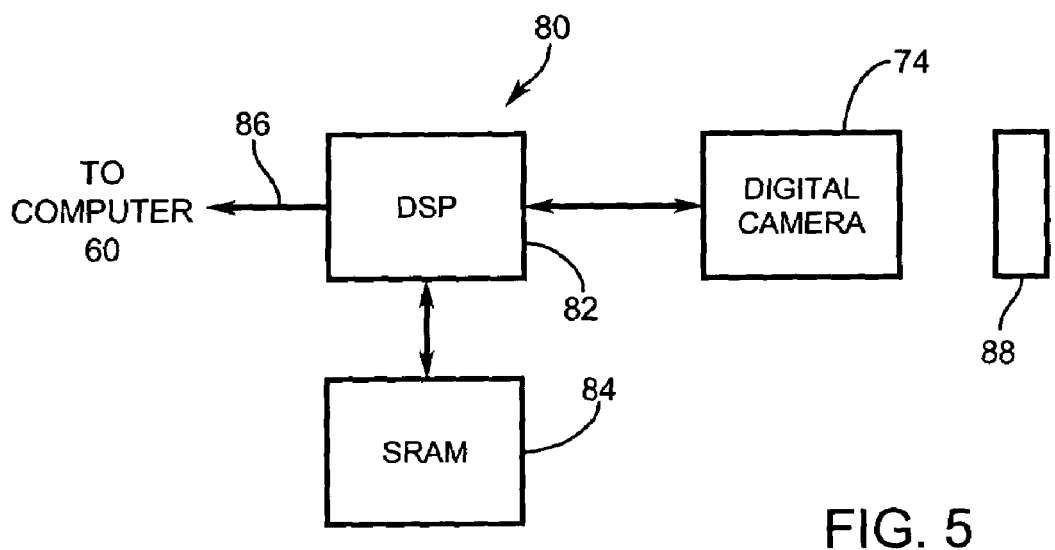
FIG. 5 is a schematic block diagram of the imaging assembly of FIG. 4.

Housing 72 also accommodates a circuit board on which the digital camera 74 and image processing circuitry 80 are mounted as shown in FIG. 5. As can be seen, the image processing circuitry 80 includes a digital signal processor (DSP) 82 coupled to the digital camera 74 and to static random access memory (SRAM) 84. The DSP 82 also communicates with the computer 60 over a data bus 86. The digital camera 74 is a high-resolution CMOS digital camera having a 640×480 pixel array such as that manufactured by National Semiconductor under model No. LM9618 and an associated lens 88. The DSP 82 is of the type manufactured by Analog Devices Inc. under model No. Blackfin BF 533 and includes a feature that allows image data to be moved from the digital camera 74 to the SRAM 84 quickly without interrupting DSP processing.

The general operation of the touch system 50 will firstly be described. When a pointer is brought into the fields of view of the digital cameras 74 and contacts the touch surface 54, each of the digital cameras 74 acquires an image including the pointer. The DSP 82 of each imaging assembly 58 moves the image data from the digital camera 74 to the SRAM 84 and then compares the image data with a mathematical model describing the boundary of the touch surface 54 as seen by the digital camera 74. This enables a pixel subset of the captured image including only relevant pixels to be processed. The DSP 82 of each imaging assembly 58 in turn processes the pixel subset to determine the (x,y) position of the pointer within the captured image. The imaging assemblies 58 in turn convey this pointer co-ordinate data to the computer 60, which uses the pointer co-ordinate data to calculate the (X,Y, Z) location of the pointer contact on the touch surface 54 using triangulation. The pointer location data is then either recorded by the computer 60 as writing or drawing or interpreted as a mouse or other event.

In order to enable pointer contacts relative to the touch surface 54 to be calculated accurately using triangulation, the touch system 50 needs to be calibrated so that either or both imaging assemblies 58 know how a particular point in a captured image relates to a physical three-dimensional location on the touch surface 54 (the "scene"). During calibration, a transformation that establishes the relationship between any point in the three-dimensional scene that each imaging assembly 58 observes and any point in a captured two-dimensional image is established. This step is necessary, since when the touch system 50 is set up, a priori information concerning the locations and orientations of the digital cameras 74 with respect to a touch surface 54 are not known.

The relationship between a point in a three-dimensional scene and its two-dimensional position in a captured image is summarized according to the collinearity equations as follows:

$$x = x_0 - \Delta_x - \frac{fR_1}{R_3}$$

$$y = y_0 - \Delta_y - \frac{fR_2}{R_3}$$

where:

(x,y) are the co-ordinates of a point in a captured image corresponding to a point (X,Y,Z) in the three-dimensional scene;

($x_0$, $y_0$) are the co-ordinates of the principal point of the digital camera 74, the location at which the optical axis of the digital camera meets the focal plane of the digital camera with the optical axis being approximately normal to the focal plane;

($\Delta_x, \Delta_y$) represent distortion terms introduced due to the imperfect nature of the lens 88;

f is the digital camera focal length; and ($R_1, R_2, R_3$) are terms depending on point (X,Y,Z), the spatial location of the optical center of the digital camera ($X_0, Y_0, Z_0$) and the orientation angles ($\omega, \phi, \kappa$) of the digital camera optical axis with respect to the three-dimensional co-ordinate system of the touch surface 54.

The above collinearity equations represent a pinhole model. Thus, each digital camera 74 is idealized as a very small aperture at the location of the digital camera's optical center (focal point), which is taken to be the position of the digital camera in three-dimensional space. The three-dimensional nature of the digital cameras' view is important in that it allows the digital cameras to see over the bezels 56, if the touch surface 54 is assumed to be planar allows the plane of the touch surface to be determined, allows a determination to be made at any point as to whether a pointer is in contact with the touch surface 54 or hovering above the touch surface 54, and allows the position of the pointer relative to the touch surface 54 to be determined.

The above collinearity equations express that a point in a three-dimensional scene with co-ordinates (X,Y,Z) projects into a two-dimensional image at point (x,y). In order to establish the transformation using the collinearity equations, the external orientation parameters ($X_0, Y_0, Z_0$) and $\omega, \phi, \kappa$ and the internal orientation parameters f, $x_0, y_0$ and $\Delta_x, \Delta_y$ of the digital cameras 74 need to be determined.

The distortion of each lens 88 can be represented by terms relating specifically to both radial distortion and decentering distortion. Due to the relativity low quality of each lens 88 and captured image data, in the present embodiment, only the first-order radial distortion term is recorded. As a result the lens distortion terms can be expressed as:

$$\Delta_x = (x-x_0)K_1((x-x_0)^2 + (y-y_0)^2)$$

$$\Delta_y = (y-y_0)K_1((x_1-x_0)^2 + (y-y_0)^2)$$

Thus, lens distortion can be summarized through parameter $K_1$.

As will be appreciated, ten (10) parameters for each digital camera 74 need to be determined from the collinearity equations to calibrate each digital camera, namely:

$$X_0, Y_0, Z_0, \omega, \phi, \kappa, f, x_0, y_0, K_1$$

In the present embodiment, a self-calibration technique is used to calibrate the touch system 50. Self-calibration is based on the fact that if the three-dimensional positions of reference points on an object are known and the two-dimensional positions of the same points can be measured in one or more images of the object, these data completely specify the location of the imaging assembly capturing the image, the angular orientation of the imaging assembly and parameters relating to the lens of the imaging assembly.

The positions ($X_0, Y_0, Z_0$) of the digital cameras 74 in three-dimensional space may be measured in absolute units (e.g., centimeters) or in relative terms by assuming a unit of length corresponding to a reference length such as for example the shorter dimension of the touch surface 54. Each digital camera's angular orientation is represented by the three angles $\omega$, $\phi$, $\kappa$ allowing a rotation matrix R for each digital camera 74 to be defined. The rotation matrix R describes the transformation between the co-ordinate system of the three-dimensional scene and that of the digital camera. Calculating the focal length f, principal point ($x_0, y_0$), and lens distortion coefficient(s) for each digital camera 74 is not necessary if precise values for these digital camera parameters are known.

During self-calibration, it is assumed that the touch surface 54 corresponds to the X-Y plane, and that the Z axis is pointing outward from the touch surface 54 at an angle generally normal to the plane of the touch surface. If image positions (x,y) corresponding to a number of scene points (X,Y,Z) are measured from an image, and the positions of the scene points (X,Y,Z) are known (e.g., in centimeters), then the collinearity equations may be set up for each point and solved using a least-squares technique to enable the external and internal orientation parameters to be determined. The least-squares method is used due to the non-linear nature of the collinearity equation model.

In the present embodiment, eight (8) calibration points around the periphery of the touch surface 54 are chosen since by doing so yields sixteen (16) equations and ten (10) unknowns, which is sufficient for a good least-squares solution. In particular, the four corners and the mid-points along each side edge of the touch surface 54 are selected as the calibration points since the (X,Y) positions at these calibration points are easy to measure, provide reproducible calibration points, are easily located by users and at each of these (X,Y) positions Z=0 cm. The corresponding image points are defined by either measuring the positions of a pointer at the calibration points captured in an image, or by measuring the positions of markers at the calibration points in a captured image.

Figure 6:
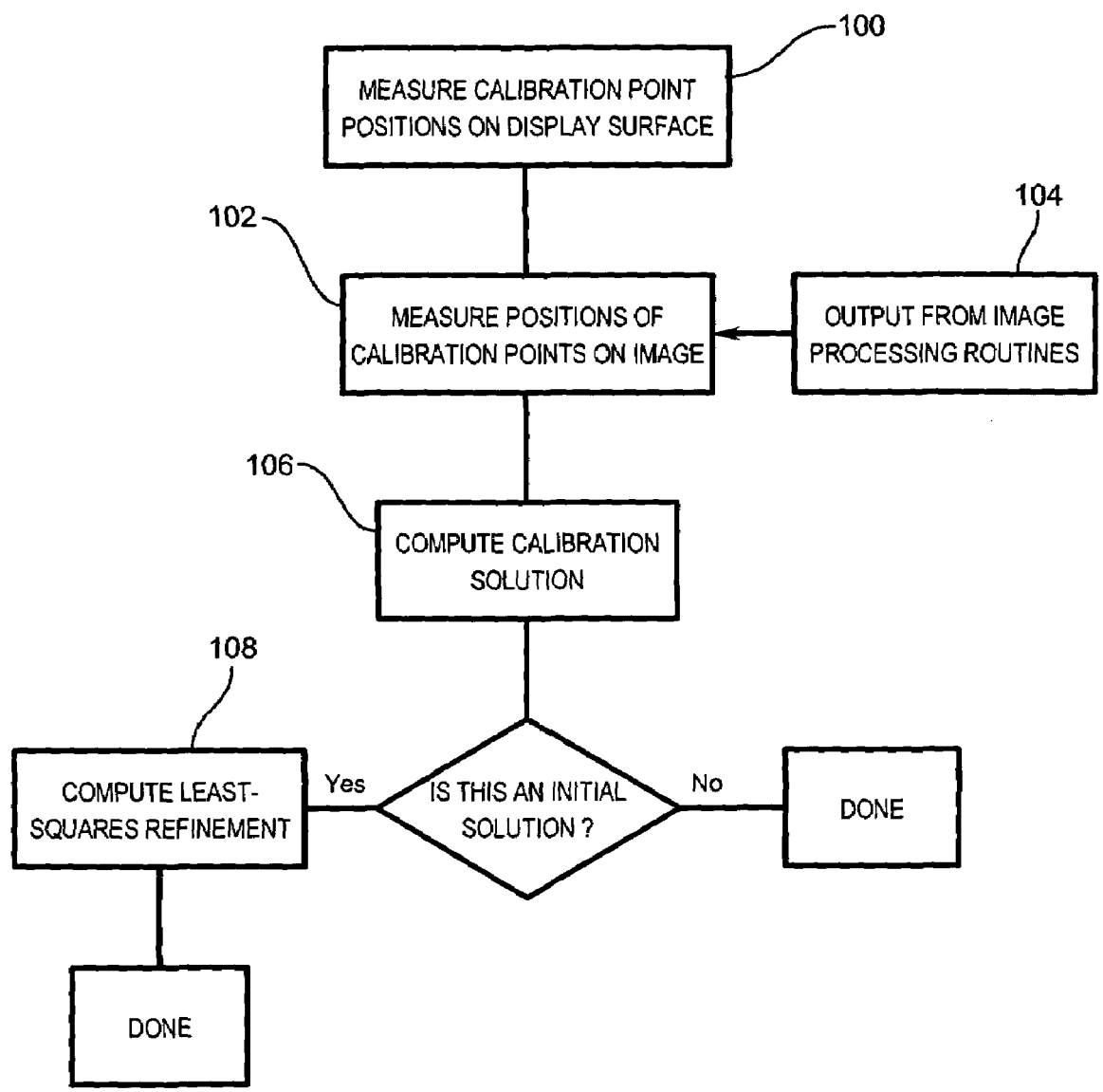
FIG. 6 is a flow chart showing the steps performed during calibration of the apparatus of FIG. 1.

Turning now to FIG. 6, a flow chart illustrating the general steps performed during self-calibration is shown. Initially the (X,Y,Z) positions of the calibration points on the touch surface 54 are determined (step 100). Specifically, the positions of the calibration points on the touch surface 54 are determined by measuring the positions of the touch surface corners and the mid-points of its side edges relative to one of the touch surface corners that is designated to be at the co-ordinate origin. Alternatively, if the aspect ratio of the touch surface 54 is known, then the short dimension of the touch surface can be taken as a unit of length, allowing the relative positions of the corners and side edge mid-points to be determined. The (x,y) positions of the calibrations points in the images are then determined through image processing (step 102), with possible initial guess input from external image processing as will be described (step 104). A calibration solution is then computed, including the internal orientation parameters if desired (step 106). If the computed solution is based on initial guess input, a least-squares refinement is computed (step 108).

Figure 7:
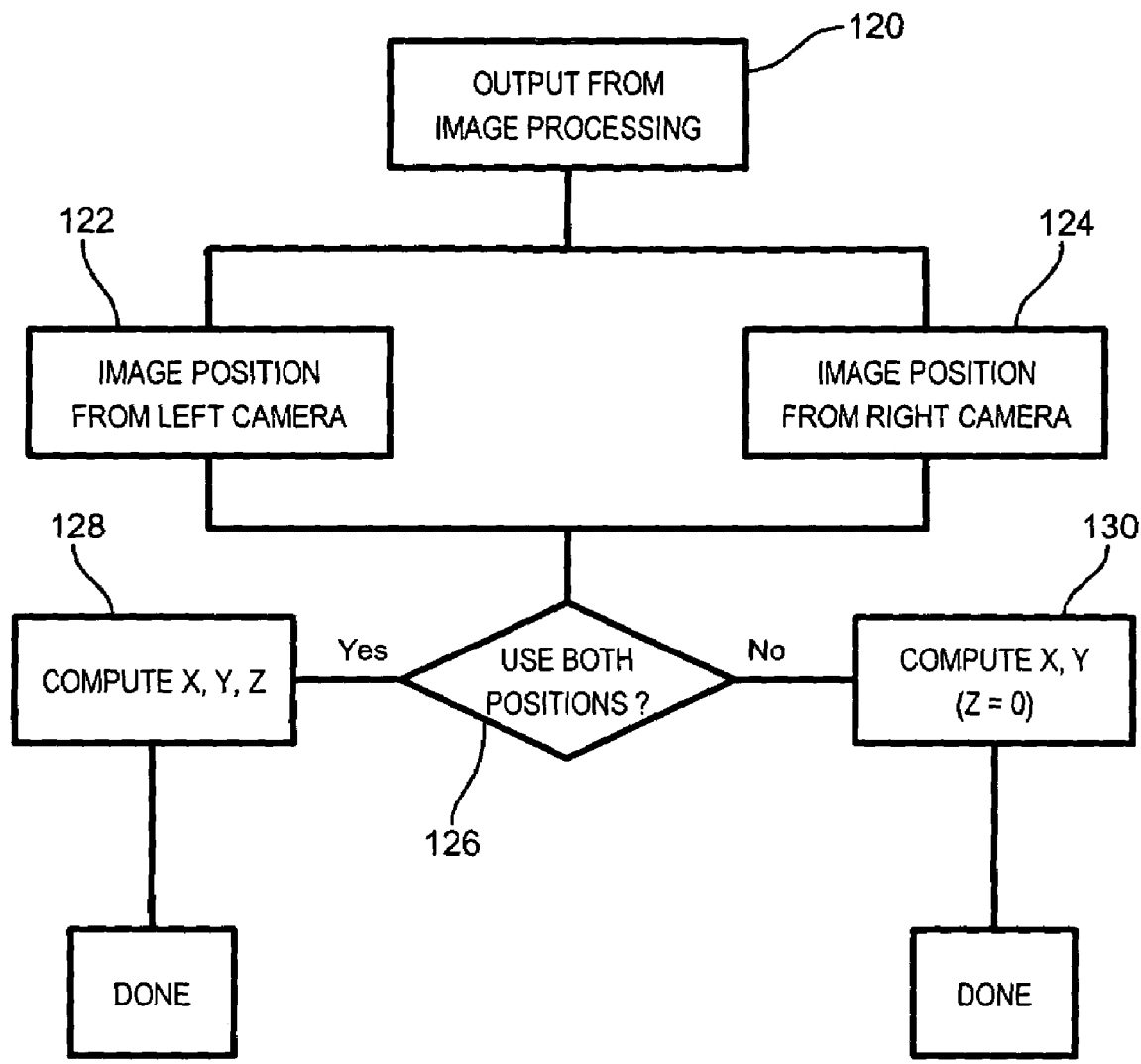
FIG. 7 is a flow chart showing the steps performed during triangulation of pointer data extracted from acquired images to determine the location of a pointer contact on the touch surface.
Figure 8A:
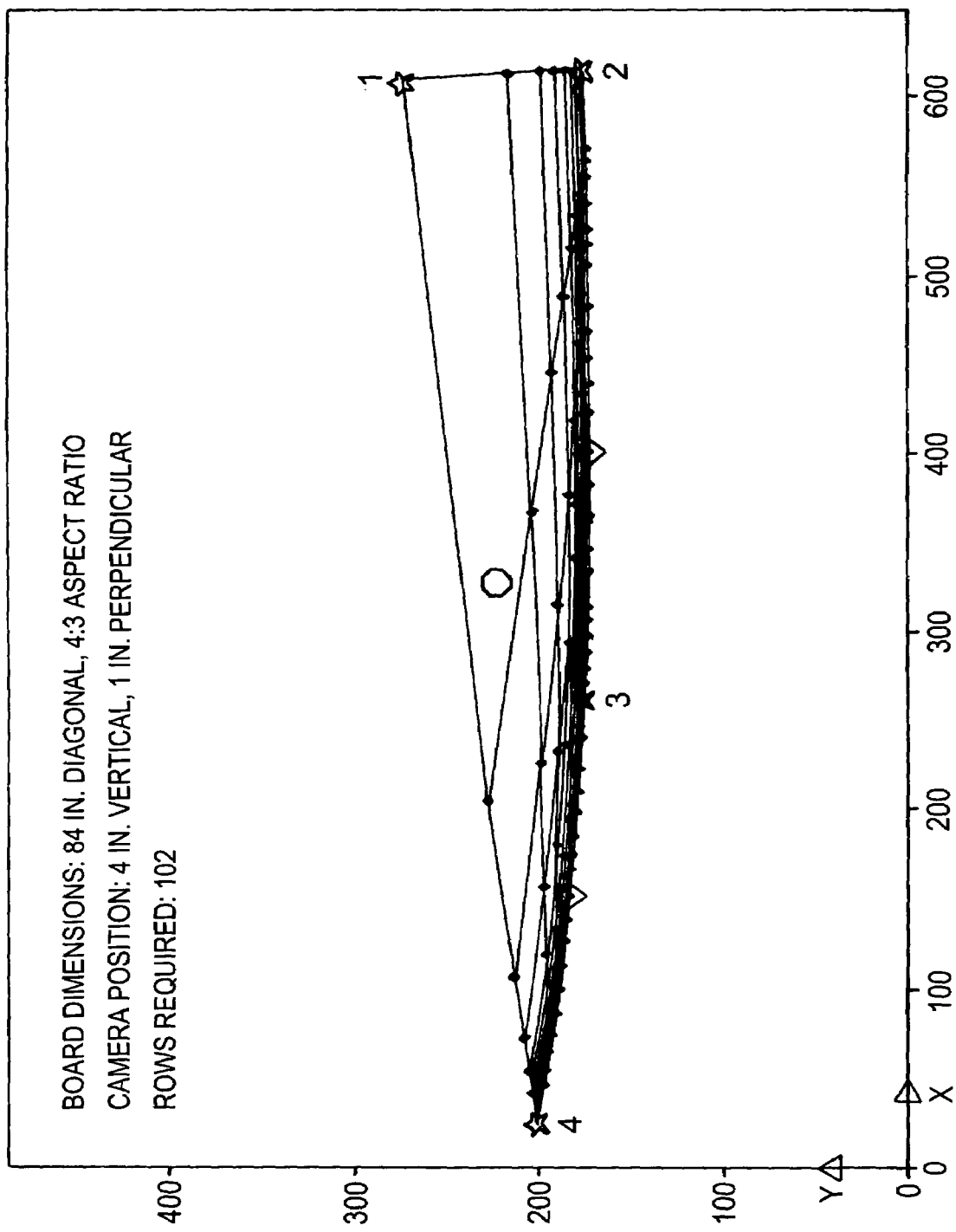
FIGS. 8a to 8d show the number of pixel rows in a captured image that must be processed for different spacings between an imaging assembly and the plane of the touch surface.
Figure 8B:
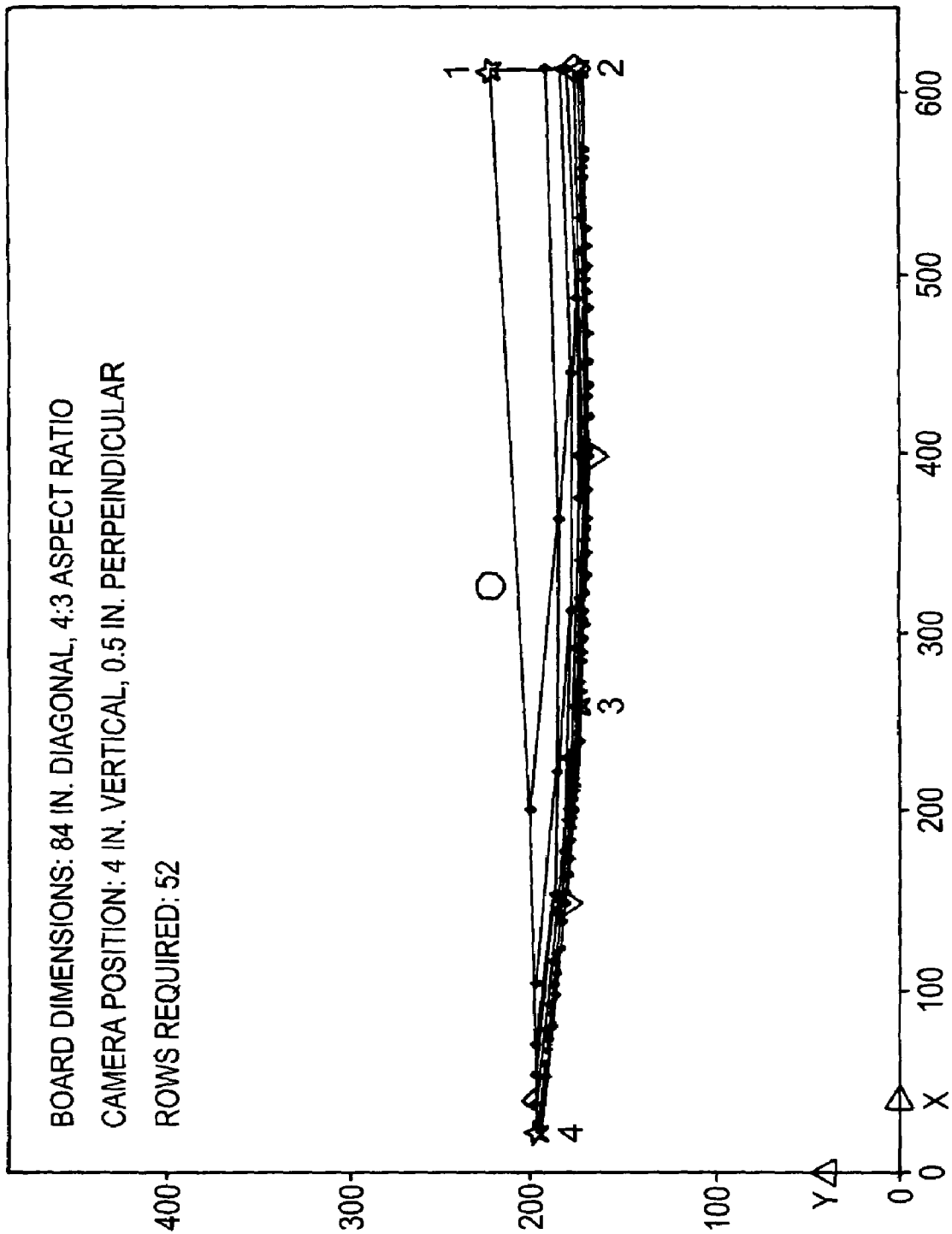
Figure 8C:
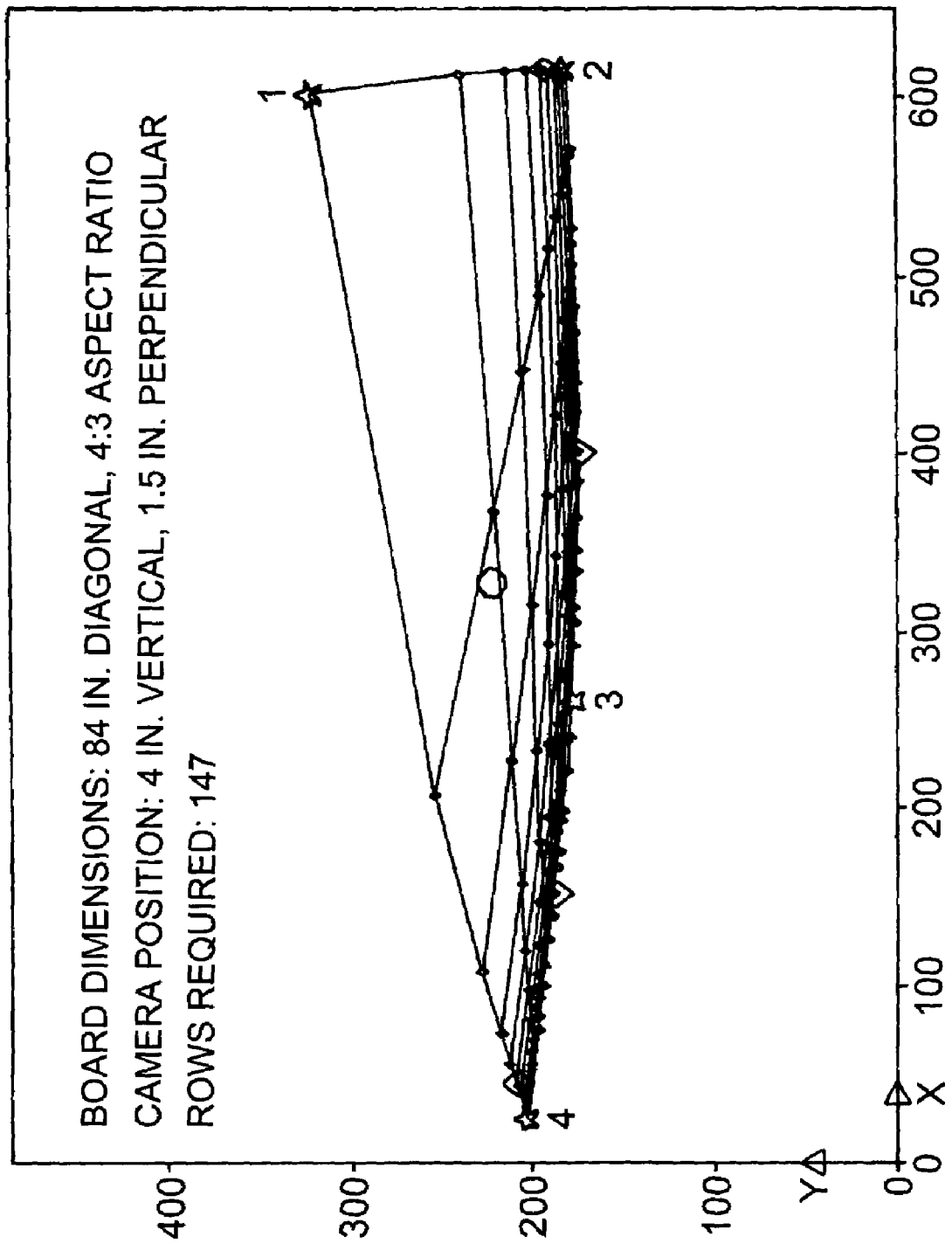
Figure 8D:
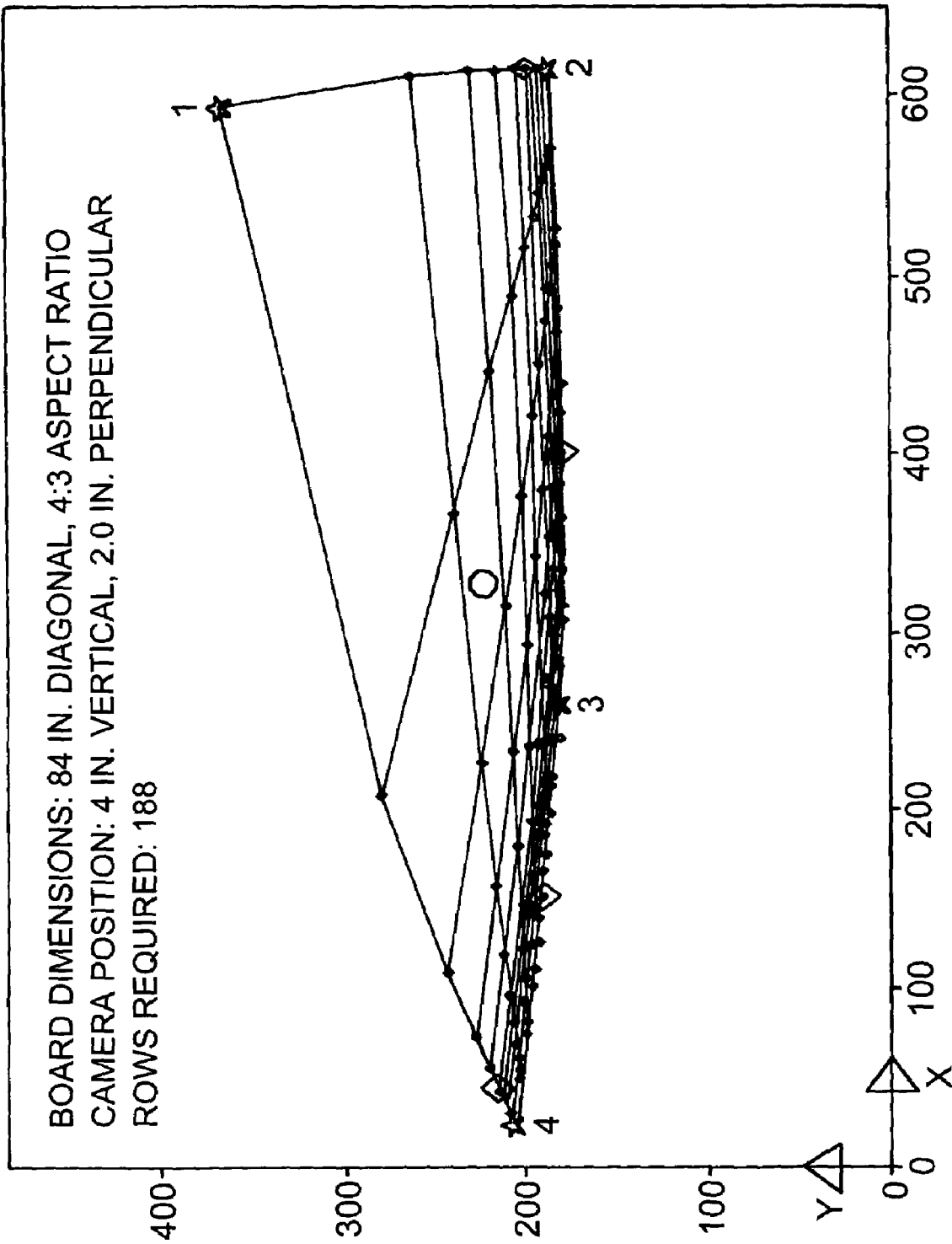

With the touch system 50 calibrated, the three-dimensional position of a pointer above or in contact with the touch surface 54 can be calculated via triangulation. During triangulation it is assumed that all of the camera orientation parameters are known and the pointer position (X,Y,Z) is to be determined given corresponding (x,y) measurements from the image captured either by one or both digital cameras 74. FIG. 7 is a flow chart illustrating the general steps performed during triangulation of pointer co-ordinate data to determine pointer contact locations relative to the touch surface. When images are captured by the imaging assemblies 58 including a pointer, the image data is processed by the DSPs 82 to determine the position of the pointer in each captured image in (x,y) co-ordinates. The DSPs 82 in turn output this pointer co-ordinate data to the computer 60 (step 120). Each DSP 82 also outputs a pointer position certainty estimate representing the degree of certainty that the DSP 82 has positively identified the actual pointer in the captured image. The computer 60, which receives pointer co-ordinate and certainty estimate data from the DSPs 82 of both imaging assemblies 58 (steps 122 and 124), makes a decision as to whether to use the pointer co-ordinate data returned by one or both imaging assemblies based on the certainty estimates (step 126). Generally, the pointer co-ordinate data generated by both DSPs 82 is used by the computer 60. If however, the certainty estimate associated on the pointer co-ordinate data generated by one of the DSPs 82 is below a threshold level, in this case 50%, representing a low degree of certainty that the pointer co-ordinate data is accurate, that pointer co-ordinate data is ignored and not used.

Triangulation is then performed using the collinearity equations referred earlier either using the pointer co-ordinate data from both imaging assemblies 58 (step 128) or using the pointer co-ordinate data from one imaging assembly 58 (step 130). Since the collinearity equations relate image position (x,y) to spatial position (X,Y,Z), two (x,y) positions, one from each digital camera 74, are necessary to compute a unique (X,Y,Z) spatial position for the pointer. This yields four equations and three unknowns. The collinearity equations are rearranged to produce a linear least-squares problem, making triangulation an efficient procedure. Since the results of the triangulation in this case yield an (X,Y,Z) spatial position for the pointer, multiple pointers appearing within the fields of view of the imaging assemblies 58 can be tracked separately thereby to provide pointer disambiguation.

When performing triangulation using pointer co-ordinate data from a single imaging assembly 58, it is assumed Z=0 (cm). In this case, one of the unknowns in the collinearity equations is eliminated. In other words, spatial position (X,Y) is determined from image position (x,y). Using images from a single imaging assembly 58 provides advantages in that the touch system 50 can still determine pointer contacts with the touch surface 54 even in instances where one of the imaging assemblies 58 is unable to see the pointer.

Once the triangulation results are available, the triangulation results can be refined using a non-linear least-squares technique if desired.

The use of imaging assemblies 58 that see the entire touch surface 54 in three-dimensions as a perspective view as well as its surrounding area provides advantages. For example, during image processing, pointers crossing the boundaries of the touch surface 54 can be recognized prior to contact on the touch surface. This information can be used by the DSPs 82 to limit image processing to pixels within the relevant pixel subset adjacent the boundary crossover points. The touch system 50 also provides shadow/object discrimination. Generally, as a pointer is brought towards the touch surface 54, one of the imaging assemblies 58 will see the pointer before the other. The imaging assembly seeing the pointer first can provide pointer information to the other imaging assembly identifying the region of its relevant pixel subset that should be examined to locate the pointer. This helps to increase the probability of locating the pointer accurately and quickly. Planar homography is used to relate the two digital camera focal planes to one another, allowing the pointer information to be effectively exchanged between the imaging assemblies 58.

Another approach is to make use of a different relationship between the views of the imaging assemblies, through an entity known as the fundamental matrix, or the closely-related essential matrix. Here, if the location of a point is known in one digital camera view, the fundamental matrix translates this point into a line in the other digital camera image. Thus, it is only necessary to search an image along this line (known as an epipolar line) to locate the corresponding point. This approach has an advantage in that it severely limits the search region in the second digital camera view and helps to eliminate false positives.

In the above-described embodiment, the imaging assemblies 58 are shown as being disposed in front of the plane of the touch surface 54 by a distance equal to approximately 2.5 cm. As mentioned, this distance ensures that the bezel 56 does not obstruct the imaging assemblies' views of the entire touch surface 54. The distances over which the imaging assemblies 58 are disposed in front of the plane of the touch surface 54 can of course vary depending on the environment although, the distances have an impact on the size of the relevant pixel subset corresponding to the boundary of the touch surface that must be processed. The imaging assemblies 58 are positioned so that, at a minimum, the four corners of the touch surface 54 are within their fields of view. FIGS. 8a to 8d show the number of pixel rows in a captured image that must be processed for different distances assuming a touch surface 54 having an 84" diagonal dimension and a 4:3 aspect ratio. As will be appreciated, as the distance increases so do the number of pixel rows that require processing in captured images.

Although a self-calibration technique has been described, other techniques can be used to calibrate the touch system 50. For example, the vanishing points for the touch surface 54 can be determined as described in the publication entitled "Geometric Computation for Machine Vison", Oxford University Press, Oxford 1993, authored by Kanatani. Alternatively planar homography as described in the publication entitled "Multiple View Geometry in Computer Vision", Cambridge University Press, Cambridge 2001, authored by Hartley et al. or the three-point method as described in the publication entitled "Minimum Solutions for Orientations in Calibration and Orientation of Cameras in Computer Vision", Springer-Verlag, New York 2001, authored by Wrobel can be used to calibrate the touch system.

During the vanishing point method, advantage of the fact that the touch surface 54 is generally rectangular in shape is taken during computation of the external orientation parameters. In this case, by finding the peripheral edges of the touch surface 54 in a digital camera image, the vanishing points corresponding to the two sets of parallel peripheral side edges of the touch surface may be used to define the external orientation parameters completely. In the touch system, the vanishing points are finite, i.e., they lie within the bounds of a digital camera image and serve to define the rotation matrix R. If a unit of length is assumed, the digital camera positions can then be determined, completing the external orientation parameter determination. The vanishing points can also be used to define the digital camera's focal length and principal point as described in the publication entitled "On Estimating Rotations", T.U. Munchen, 1999, authored by Foerstner. As will be appreciated, the two vanishing points define a three-dimensional co-ordinate system for the touch system, from which everything else follows. When using this approach it is preferred that the determined external orientation parameters be refined using a least-squares method.

The planar homography calibration approach relates points on the plane of the touch surface 54 to points on the image plane of the digital camera. By measuring the positions of a number of image points corresponding to certain scene points, it is possible to define the nine components of the homography matrix. Once this is done, the homography matrix can be decomposed into the rotation matrix R and a vector representing the digital camera's position in three-dimensional space. Using this calibration method requires some assumptions about the digital camera's internal orientation to be made. The need to make these assumptions can however be avoided by rewriting the homography matrix as another matrix entity known as the image of the absolute conic as described in the previously mentioned Hartley et al. publication. This matrix entity provides direct estimates of the focal length and principal point of the digital camera through its singular value decomposition.

The three-point calibration method makes use of basic trigonometry and the fact that three points define a plane. If the locations and distances between three points in a three-dimensional scene are known and form a triangle, then the image positions of these points may be used to define angles between the points. This information is sufficient to solve for the distances of the three points from the digital camera's optical center, thus giving the digital camera's position in space. Subsequent processing of the image points then provides an estimate of the rotation matrix R. As this method gives an orientation from a minimal data set, it can be used to initialize a least-squares method for refining the orientation, and hence to provide the initial guess input at step 104 during calibration.

Although the above-described calibration techniques make use of three angles to define the orientation of each digital camera 74 in space through a rotation matrix R, alternatives are available. For example rather than defining the rotation matrix R, the orientation of each digital camera in space can be determined based on an entity known as a "quaternion". A quaternion is a four-element vector with certain properties as described in the previously mentioned Foerstner publication. Quaternion elements take on only values between −1 and 1, with one of the elements being constrained to be 1. This avoids problems associated with abrupt changes in value and assists greatly in the convergence using a least-squares approach. As will be appreciated, when measuring angles, some angle changes create difficulty such as for example when an angle changes from 359 degrees to 360 degrees, which is the same as 0 degrees.

Figure 9:
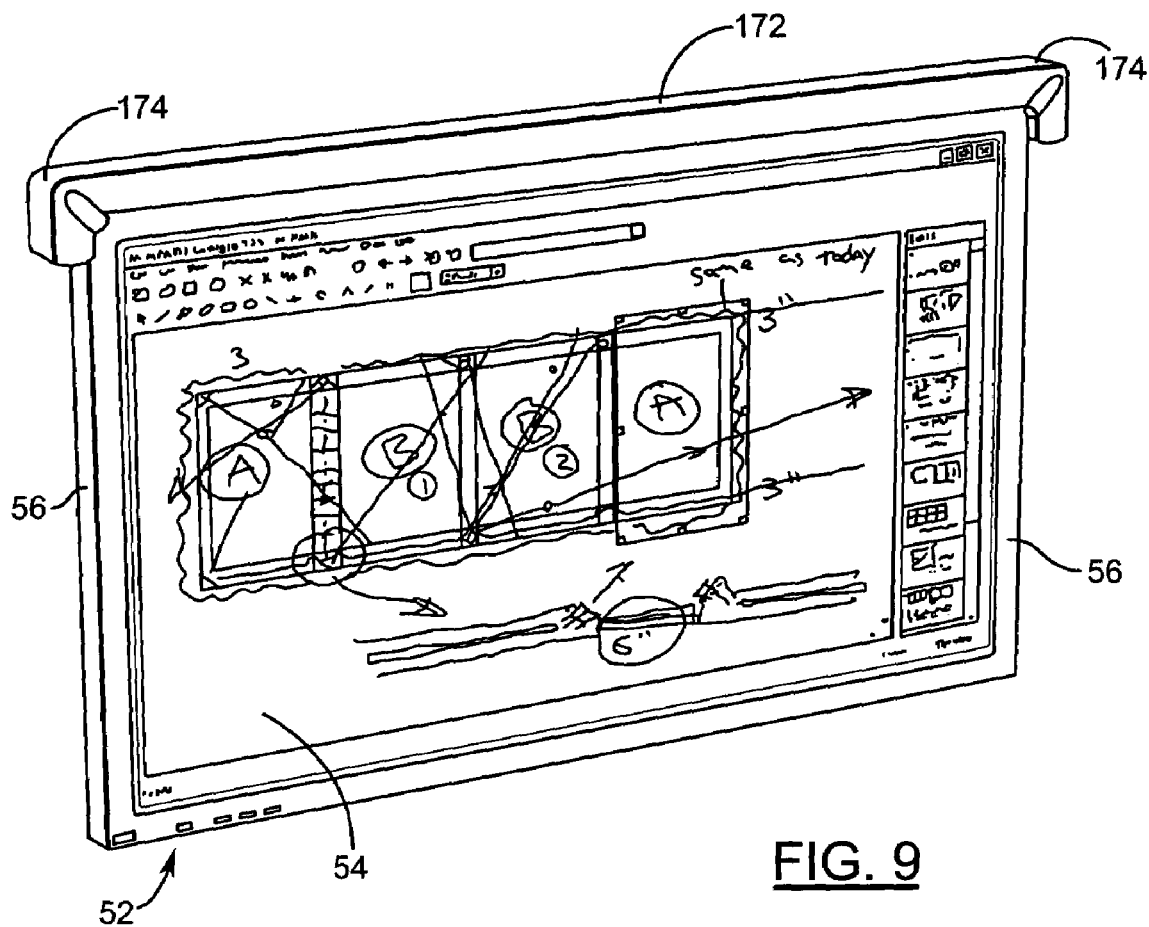
FIG. 9 is a perspective view of another embodiment of apparatus for detecting a pointer relative to a touch surface.

FIG. 9 shows another embodiment of an apparatus for detecting a pointer relative to a touch surface 54. In this embodiment, both digital cameras 174 are accommodated within a single housing 172 adjacent its opposite ends. The housing 172 overlies the top edge of the bezel 56 and spans the touch screen 52 so that the digital cameras 174 are positioned adjacent the top corners of the touch screen.

Figure 10:
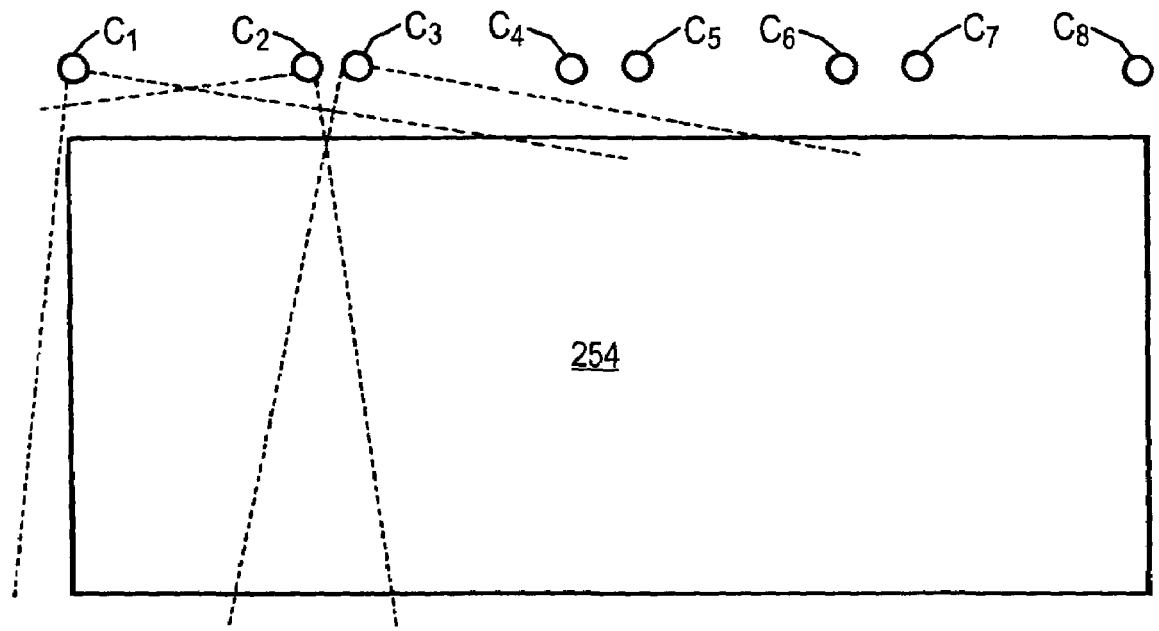
FIG. 10 is a front view of yet another embodiment of an apparatus for detecting a pointer relative to a touch surface.

Imaging assemblies that see the touch surface in three-dimensions as a perspective view can also be used in conjunction with large scale touch systems such as those described in U.S. patent application Ser. No. (not available) filed on Jan. 2, 2004 to Hill et al., assigned to SMART Technologies Inc., assignee of the present invention, the content of which is incorporated herein by reference. For example, FIG. 10 shows a digital camera arrangement for a large scale touch system. In this embodiment, digital cameras $C_1$ to $C_8$ are provided along the top of the touch surface 254 and look back at and across the touch surface. In particular, digital cameras $C_1$ and $C_8$ are located at the top left and top right corners of the touch surface 254. Intermediate pairs of digital cameras $C_2$ and $C_3$, $C_4$ and $C_5$ and $C_6$ and $C_7$ are located at spaced locations along the top of the touch surface 254. The fields of view of the digital cameras are shown by the dotted lines. As can be seen, the fields of view of the cameras overlap so that each location on the touch surface 254 falls within the fields of view of at least two digital cameras. This of course allows a pointer to be tracked across the entire touch surface 254 using triangulation in the same manner described above.

Figure 11:
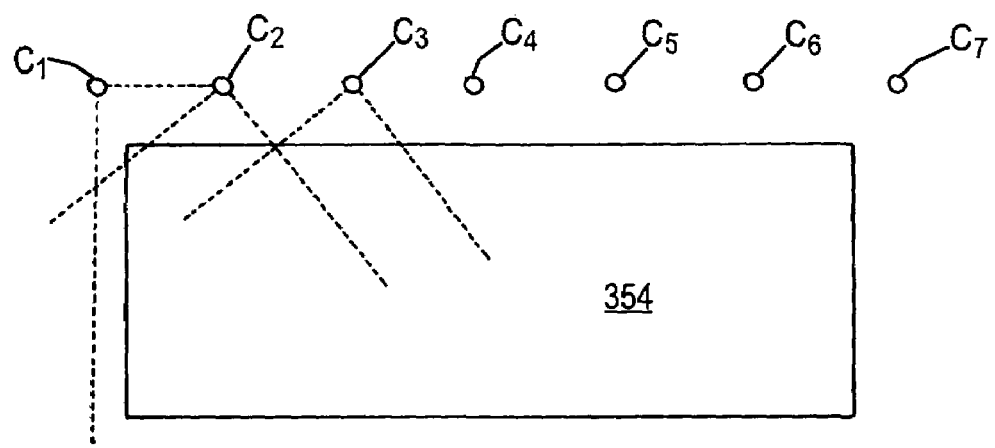
FIG. 11 is still yet another embodiment of an apparatus for detecting a pointer relative to a touch surface.

FIG. 11 shows yet another digital camera arrangement for a large scale touch system. In this embodiment, evenly spaced digital cameras $C_1$ to $C_7$ are positioned above the top edge of the touch surface 354 and look back at and across the touch surface. The fields of view of the digital cameras are shown by the dotted lines and as can be seen, the fields of view of the digital cameras overlap so that each location on the touch surface falls within the fields of view of at least two digital cameras. Again this allows a pointer to be tracked across the entire touch surface 354 using triangulation in the same manner described above. In this embodiment, most locations on the touch surface 354 fall within the fields of view of more than two digital cameras allowing multiple triangulation results to be generated for each pointer contact. Depending on the pointer contact locations, different logic can be used to select the triangulation results to be used to determine the pointer contact location.

Figure 12A:
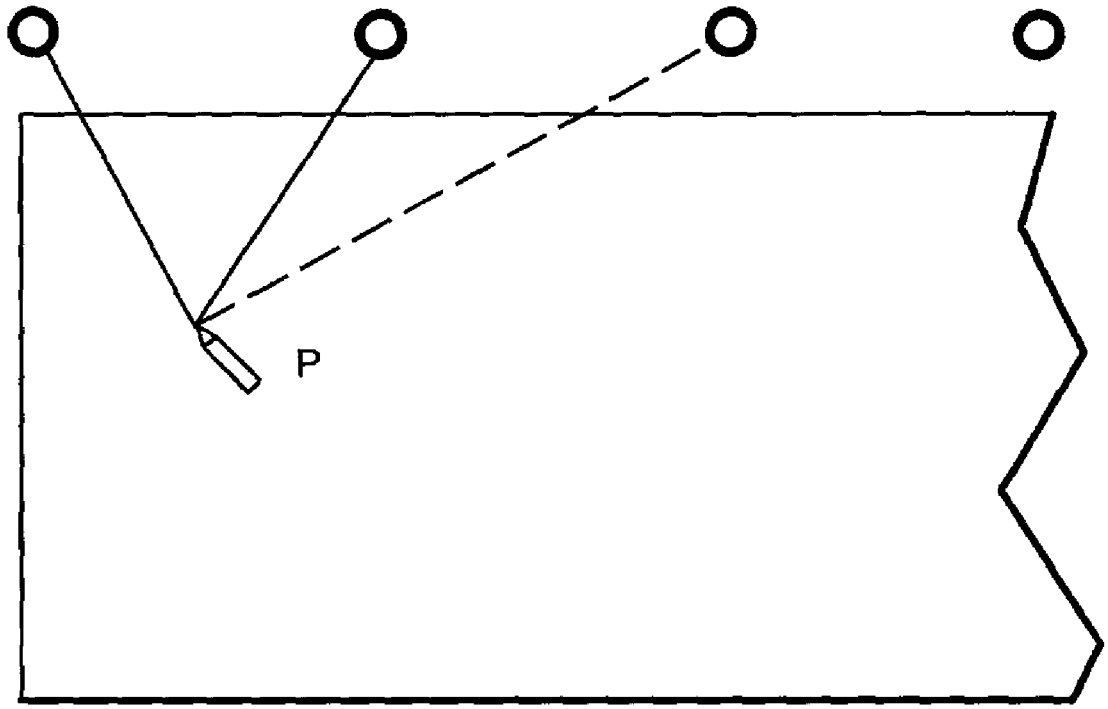
FIGS. 12a to 12c show different pointer contacts on the touch surface of the apparatus of FIG. 11.
Figure 12B:
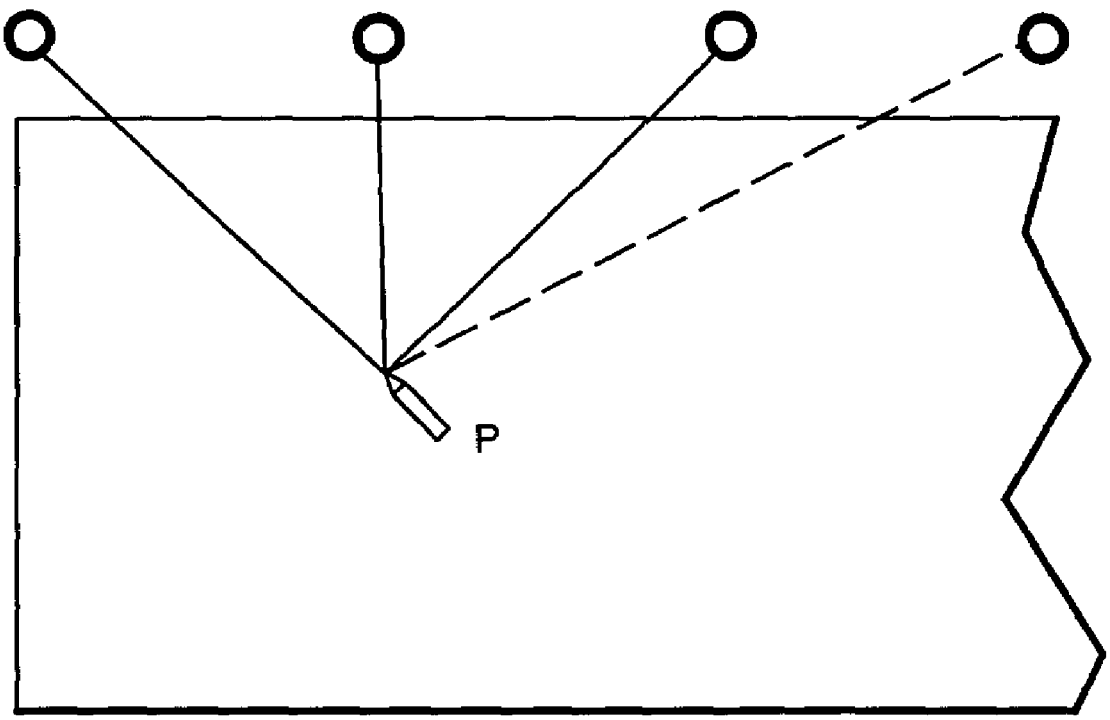
Figure 12C:
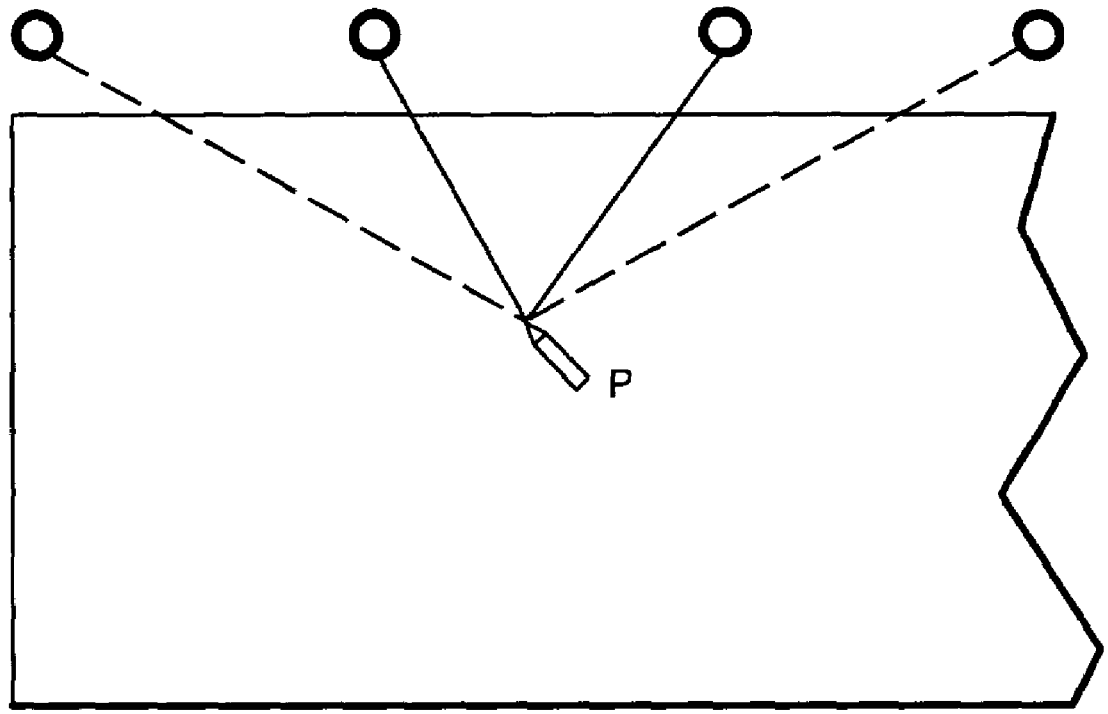

For example, as shown in FIG. 12a, the position of pointer P on touch surface 354 can be calculated by triangulating pointer information derived from images captured by digital cameras $C_1$ and $C_2$ and possibly by triangulating pointer information derived from images captured by digital camera $C_3$. In this latter case pointer information derived from images captured by digital cameras $C_1$ and $C_3$ and digital cameras $C_2$ and $C_3$ can be triangulated resulting in multiple triangulation results. The multiple triangulation results can be averaged or processed according to other logic to yield a single pointer position. If digital camera $C_3$ is deemed to be too far from the pointer P, the result from the digital camera $C_3$ can be ignored.

Alternatively, pointer information derived from images captured by digital camera $C_3$ can be used to track the pointer to determine when the pointer reaches a certain proximity to the digital camera $C_3$. When the pointer reaches a certain proximity to the digital camera $C_3$, the pointer information derived from images captured by digital camera $C_3$ can be triangulated to determine the position of the pointer on the touch surface 354.

FIGS. 13b and 13c show other positions of pointers on the touch surface 354 and the various triangulation results that can be derived from images captured by the digital cameras.

By pairing the digital cameras, curved and non-planar touch surfaces can be supported since the various pairs of digital cameras need only be responsible for viewing a portion of the touch surface.

As will be appreciated, since the imaging assemblies are able to self-calibrate, the imaging assemblies can be affixed basically to any surface to convert that surface to a touch surface.

Although the touch system 50 is described as including a computer communicating with the DSPs of the imaging assemblies and processing the pointer co-ordinate data using triangulation to determine the position of the pointer relative to the touch surface, other processing architectures can of course be used. For example, the DSP of one of the imaging assemblies may serve as the processor responsible for triangulating the pointer co-ordinate data.

Although preferred embodiments of the present invention have been described, those of skill in the art will appreciate that variations and modifications may be made without departing from the spirit and scope thereof as defined by the appended claims.

What is claimed is:

1. An apparatus for detecting a pointer relative to a touch surface comprising:
at least two spaced imaging devices having overlapping fields of view, each of said imaging devices having a field of view that looks back at the touch surface such that said imaging devices see said touch surface in three-dimensions as a perspective view including the boundaries of said touch surface, said imaging devices acquiring overlapping images from different viewpoints, each imaging device comparing acquired images with a model describing the boundaries of said touch surface thereby to determine a subset of pixels in each acquired image and processing each pixel subset to generate image data; and
processing structure processing image data generated by at least one of said imaging devices to determine the location of the pointer.

2. An apparatus according to claim 1 wherein each imaging device is calibrated to establish the relationship between points (X,Y,Z) in its perspective view and points (x,y) in acquired images, each imaging device generating pointer co-ordinate data when a pointer exists in an acquired image.

3. An apparatus according to claim 1 wherein said processing structure triangulates the image data to determine the location of the pointer relative to said touch surface.

4. An apparatus according to claim 3 including a pair of imaging devices.

5. An apparatus according to claim 4 wherein each imaging device is positioned adjacent a different corner of said touch surface.

6. An apparatus according to claim 5 wherein each imaging device is laterally spaced from and spaced in front of said touch surface.

7. An apparatus according to claim 6 wherein each imaging device is positioned relative to said touch surface so that at a minimum the entire periphery of the touch surface is within its field of view.

8. An apparatus according to claim 7 wherein each imaging device is spaced in front of said touch surface by a distance equal to at least 2.5 cm.

9. An apparatus according to claim 8 wherein said touch surface is bordered by a bezel.

10. An apparatus according to claim 7 wherein each imaging device is aimed so that the optical axis thereof bisects a corner of said touch surface.

11. An apparatus according to claim 2 wherein during calibration external orientation parameters $(X_0,Y_0,Z_0)$ and $(\omega,\phi,\kappa)$ of each imaging device are determined where:
$(X_0,Y_0,Z_0)$ is the spatial location of the optical center of the imaging device; and
$(\omega,\phi,\kappa)$ are the orientation angles of the optical axis of the imaging device with respect to the three-dimensional co-ordinate system of the touch surface.

12. An apparatus according to claim 11 wherein during calibration internal orientation parameters $f, x_0, y_0$ and $\Delta_x, \Delta_y$ of each imaging device are also determined where:
$(\Delta_x, \Delta_y)$ represent distortion terms introduced due to the imperfect nature of a lens of the imaging device;
f is the focal length of the imaging device; and
$(x_0, y_0)$ are the co-ordinates of the principal point of the imaging device.

13. An apparatus according to claim 12 wherein said relationship is expressed using collinearity equations as:

$$x = x_0 - \Delta_x - \frac{fR_1}{R_3}$$

$$y = y_0 - \Delta_y - \frac{fR_2}{R_3}$$

where:
(x,y) are the co-ordinates of a point in a captured image corresponding to a point (X,Y,Z) in the three-dimensional perspective view; and
$(R_1, R_2, R_3)$ are terms depending on point (X,Y,Z), the spatial location $(X_0, Y_0, Z_0)$ and the orientation angles $(\omega, \phi, \kappa)$.

14. An apparatus according to claim 13 wherein during calibration, calibration points (X,Y,Z) on said touch surface and image points (x,y) corresponding to said calibration points are measured, said collinearity equations being solved using said measured calibration and image points thereby to determine said external and internal orientation parameters.

15. An apparatus according to claim 14 wherein said collinearity equations are solved using a least-squares method.

16. An apparatus according to claim 14 wherein said calibration points are at spaced locations along the periphery of said touch surface.

17. An apparatus according to claim 16 wherein said calibration points are located at the corners and edge mid-points of said touch surface.

18. An apparatus according to claim 11 wherein said external orientation parameters are determined using a vanishing point method.

19. An apparatus according to claim 18 wherein the determined external orientation parameters are refined using a least-squares method.

20. An apparatus according to claim 18 wherein said external and internal orientation parameters are determined using planar homography.

21. An apparatus according to claim 18 wherein said external orientation parameters are determined using a three point method.

22. An apparatus according to claim 2 wherein each imaging device also generates a certainty value representing the degree of certainty that the imaging device has positively identified the pointer in the acquired image.

23. An apparatus according to claim 22 wherein said certainty value is used by said processing structure to determine pointer co- ordinate data to be used to determine the position of said pointer.

24. An apparatus according to claim 23 wherein said processing structure ignores pointer co-ordinate data generated by said imaging device when the certainty value associated therewith is below a threshold level.

25. An apparatus according to claim 24 including a pair of imaging devices.

26. An apparatus according to claim 25 wherein each imaging device is positioned adjacent a different corner of said touch surface.

27. An apparatus according to claim 26 wherein each imaging device is laterally spaced from and spaced in front of said touch surface.

28. An apparatus according to claim 27 wherein each imaging device is positioned relative to said touch surface so that at a minimum the entire periphery of the touch surface is within its field of view.

29. An apparatus according to claim 28 wherein each imaging device is aimed so that the optical axis thereof bisects the corner of said touch surface.

30. An apparatus according to claim 2 wherein said imaging devices communicate to assist in determining a pointer in acquired images.

31. An apparatus according to claim 30 wherein the imaging device that detects a pointer in its acquired image first communicates data to the other imaging device to assist that imaging device to detect the pointer in its acquired image.

32. An apparatus according to claim 31 wherein each imaging device also generates a certainty value representing the degree of certainty that the imaging device has positively identified the pointer in the acquired image.

33. An apparatus according to claim 32 wherein said certainty value is used by said processing structure to determine pointer co-ordinate data to be used to determine the position of said pointer.

34. An apparatus according to claim 33 wherein said processing structure ignores pointer co-ordinate data generated by said imaging device when the certainty value associated therewith is below a threshold level.

35. An apparatus according to claim 34 including a pair of imaging devices.

36. An apparatus according to claim 35 wherein each imaging device is positioned adjacent a different corner of said touch surface.

37. An apparatus according to claim 36 wherein each imaging device is laterally spaced from and spaced in front of said touch surface.

38. An apparatus according to claim 37 wherein each imaging device is positioned relative to said touch surface so that at a minimum the entire periphery of the touch surface is within its field of view.

39. An apparatus according to claim 38 wherein each imaging device is aimed so that the optical axis thereof bisects the corner of said touch surface.

40. An apparatus according to claim 14 wherein each imaging device also generates a certainty value representing the degree of certainty that the imaging device has positively identified the pointer in the acquired image.

41. An apparatus according to claim 40 wherein said certainty value is used by said processor to determine pointer co-ordinate data to be used to determine the position of said pointer.

42. An apparatus according to claim 41 wherein said processing structure ignores pointer co-ordinate data generated by said imaging device when the certainty value associated therewith is below a threshold level.

43. An apparatus according to claim 42 including a pair of imaging devices.

44. An apparatus according to claim 43 wherein each imaging device is positioned adjacent a different corner of said touch surface.

45. An apparatus according to claim 44 wherein each imaging device is laterally spaced from and spaced in front of said touch surface.

46. An apparatus according to claim 45 wherein each imaging device is positioned relative to said touch surface so that at a minimum the entire periphery of the touch surface is within its field of view.

47. An apparatus according to claim 46 wherein each imaging device is aimed so that the optical axis thereof bisects the corner of said touch surface.

48. An apparatus according to claim 2 wherein said imaging devices are portable.

49. An apparatus according to claim 48 wherein each imaging device includes a digital camera and a digital signal processor mounted within a housing, said digital signal processor processing image frames acquired by said digital camera to generate said pointer co-ordinate data.

50. An apparatus according to claim 48 wherein each imaging device includes a digital camera and a digital signal processor, both imaging devices being mounted within a single housing, said digital signal processor processing image data acquired by said digital camera to generate said pointer co-ordinate data.

51. An apparatus according to claim 3 including three or more imaging devices at spaced locations along said touch surface, each imaging device having a field of view encompassing a different portion of said touch surface.

52. An apparatus according to claim 51 wherein said imaging devices are arranged in pairs, with each pair of imaging devices viewing a different portion of said touch surface.

53. A camera-based touch system comprising:

a generally rectangular passive touch surface on which contacts are made using a pointer;

camera devices removably mounted adjacent at least two corners of said touch surface, each of said camera devices being disposed in front of the plane of the touch surface and having a field of view looking across and back towards said touch surface, the fields of view of said camera devices overlapping over said touch surface such that said camera devices see said touch surface and the boundaries thereof in perspective views, said camera devices acquiring images of said touch surface from different viewpoints, each camera device comparing each acquired image with a mathematical model describing the boundaries of said touch surface as seen by said camera device to determine a subset of relevant pixels of the acquired image corresponding generally to said touch surface and processing the subset of relevant pixels of each acquired image to generate image data; and a processor receiving and processing said image data to determine the location of said pointer relative to said touch surface via triangulation.

54. A touch system according to claim 53 wherein each camera device is calibrated to establish the relationship between points (X,Y,Z) in its perspective view and points (x,y) in acquired images, each camera device generating pointer co-ordinate data when a pointer is captured in an acquired image.

55. A touch system according to claim 54 wherein each camera device is spaced in front of said touch surface a sufficient distance so that at a minimum each camera device sees the four corners and sides of said touch surface with its field of view.

56. A touch system according to claim 55 wherein each camera device also generates a certainty value representing the degree of certainty that the camera device has positively identified the pointer in the acquired image.

57. A touch system according to claim 56 wherein said certainty value is used by said processor to determine pointer co-ordinate data to be used to determine the position of said pointer relative to said touch surface.

58. A touch system according to claim 57 wherein said processor ignores pointer co-ordinate data generated by said camera device when the certainty value associated therewith is below a threshold level.

59. An apparatus for detecting a pointer relative to a generally rectangular touch surface comprising:
   at least two spaced imaging devices having overlapping fields of view encompassing said touch surface, said imaging devices being spaced in front of said touch surface and looking back to see said touch surface in three-dimensions as a perspective view with the perspective view including at least the four corners and sides of said touch surface, said imaging devices acquiring overlapping images from different viewpoints, each imaging device comparing each captured image with a mathematical model describing the boundaries of the touch surface to determine a subset of relevant pixels within the captured image and processing the subset of relevant pixels in each captured image to generate image data, said relevant pixel subset encompassing said touch surface; and
   a processor receiving and processing image data generated by at least one of said imaging devices to determine the location of the pointer relative to said touch surface using triangulation.

60. An apparatus according to claim 59 wherein each imaging device is calibrated to establish the relationship between points (X,Y,Z) in its perspective view and points (x,y) in acquired images, each imaging device outputting pointer co-ordinate data when a pointer is captured in an acquired image.

61. An apparatus according to claim 60 wherein each imaging device is spaced in front of said touch surface a sufficient distance to inhibit its view of the entire touch surface from being obstructed.

62. An apparatus according to claim 61 wherein each imaging device also generates a certainty value representing the degree of certainty that the imaging device has positively identified the pointer in the acquired image.

63. An apparatus according to claim 62 wherein said certainty value is used by said processor to determine pointer co-ordinate data to be used to determine the position of said pointer relative to said touch surface.

64. An apparatus according to claim 63 wherein said processor ignores pointer co-ordinate data generated by said imaging device when the certainty value associated therewith is below a threshold level.

65. An apparatus for detecting a pointer relative to a touch surface comprising:
   at least two spaced imaging devices having overlapping fields of view, each of said imaging devices being in front of the touch surface and looking back at the touch surface such that said imaging devices see said touch surface in three-dimensions as a perspective view including the boundaries of said touch surface, said imaging devices acquiring overlapping images from different viewpoints; and
   processing structure processing image data generated by at least one of said imaging devices to determine the location of the pointer, wherein each imaging device is calibrated to establish the relationship between points (X,Y,Z) in its perspective view and points (x,y) in acquired images, each imaging device generating pointer co-ordinate data when a pointer exists in an acquired image and wherein during calibration external orientation parameters $(X_0,Y_0,Z_0)$ and $(\omega,\phi,\kappa)$ of each imaging device are determined where:
   $(X_0,Y_0,Z_0)$ is the spatial location of the optical center of the imaging device; and
   $(\omega,\phi,\kappa)$ are the orientation angles of the optical axis of the imaging device with respect to the three-dimensional co-ordinate system of the touch surface.

66. An apparatus according to claim 65 wherein during calibration internal orientation parameters $f, x_0, y_0$ and $\Delta_x, \Delta_y$ of each imaging device are also determined where:
   $(\Delta_x, \Delta_y)$ represent distortion terms introduced due to the imperfect nature of a lens of the imaging device;
   f is the focal length of the imaging device; and
   $(x_0, y_0)$ are the co-ordinates of the principal point of the imaging device.

67. An apparatus according to claim 66 wherein said relationship is expressed using collinearity equations as:

$$x = x_0 - \Delta_x - \frac{fR_1}{R_3}$$
$$y = y_0 - \Delta_y - \frac{fR_2}{R_3}$$

where:
   (x,y) are the co-ordinates of a point in a captured image corresponding to a point (X,Y,Z) in the three-dimensional perspective view; and
   $(R_1, R_3 R_3)$ are terms depending on point (X,Y,Z), the spatial location $(X_0,Y_0,Z_0)$ and the orientation angles $(\omega,\phi,\kappa)$.

68. An apparatus according to claim 67 wherein during calibration, calibration points (X,Y,Z) on said touch surface and image points (x,y) corresponding to said calibration points are measured, said collinearity equations being solved using said measured calibration and image points thereby to determine said external and internal orientation parameters.

69. An apparatus according to claim 68 wherein said collinearity equations are solved using a least-squares method.

70. An apparatus according to claim 68 wherein said calibration points are at spaced locations along the periphery of said touch surface.

71. An apparatus according to claim 70 wherein said calibration points are located at the corners and edge mid-points of said touch surface.

72. An apparatus according to claim 65 wherein said external orientation parameters are determined using a vanishing point method.

73. An apparatus according to claim 72 wherein the determined external orientation parameters are refined using a least-squares method.

74. An apparatus according to claim 72 wherein said external and internal orientation parameters are determined using planar homography.

75. An apparatus according to claim 72 wherein said external orientation parameters are determined using a three point method.

* * * * *